(12) United States Patent
Lolli

(10) Patent No.: US 9,957,372 B2
(45) Date of Patent: May 1, 2018

(54) SEALING COMPOSITION FOR REPAIRING TYRES

(75) Inventor: Sergio Lolli, Pesaro (IT)

(73) Assignee: Tek Global S.R.L., Pesaro (IT)

( * ) Notice: Subject to any disclaimer, the term of this patent is extended or adjusted under 35 U.S.C. 154(b) by 0 days. days.

(21) Appl. No.: 13/992,042

(22) PCT Filed: Dec. 21, 2011

(86) PCT No.: PCT/IB2011/055878
§ 371 (c)(1),
(2), (4) Date: Aug. 27, 2013

(87) PCT Pub. No.: WO2012/085869
PCT Pub. Date: Jun. 28, 2012

(65) Prior Publication Data
US 2013/0338287 A1  Dec. 19, 2013

Related U.S. Application Data

(60) Provisional application No. 61/434,888, filed on Jan. 21, 2011.

(30) Foreign Application Priority Data

Dec. 21, 2010  (IT) .......................... TO2010A01031

(51) Int. Cl.
| | | |
|---|---|---|
| *C08L 7/02* | (2006.01) | |
| *C08K 5/053* | (2006.01) | |
| *C08L 7/00* | (2006.01) | |
| *B29C 73/16* | (2006.01) | |
| *C08K 3/34* | (2006.01) | |
| *C08K 5/05* | (2006.01) | |
| *C08L 21/02* | (2006.01) | |
| *C08L 9/08* | (2006.01) | |
| *C08K 3/36* | (2006.01) | |
| *C08L 13/02* | (2006.01) | |

(52) U.S. Cl.
CPC ............ *C08K 5/053* (2013.01); *B29C 73/163* (2013.01); *C08K 3/346* (2013.01); *C08K 5/05* (2013.01); *C08L 7/00* (2013.01); *C08L 7/02* (2013.01); *C08L 21/02* (2013.01); *C08K 3/36* (2013.01); *C08L 9/08* (2013.01); *C08L 13/02* (2013.01)

(58) Field of Classification Search
CPC .... C08L 7/02; C08L 9/08; C08L 21/02; C08L 13/02; C08K 5/05; C08K 5/053; C08K 3/346; C08K 3/36; B29C 73/163
See application file for complete search history.

(56) References Cited

U.S. PATENT DOCUMENTS

| 4,116,895 | A | * | 9/1978 | Kageyama et al. .......... 524/574 |
| 5,500,456 | A | * | 3/1996 | Hughett ................ B29C 73/163 523/166 |
| 6,176,285 | B1 | * | 1/2001 | Gerresheim et al. ......... 152/509 |
| 2002/0121331 | A1 | | 9/2002 | Gerresheim et al. |
| 2007/0149653 | A1 | * | 6/2007 | Sugio et al. .................. 523/334 |
| 2011/0021731 | A1 | * | 1/2011 | Hirata .................... C08G 61/08 526/281 |
| 2011/0144237 | A1 | * | 6/2011 | Takahara et al. ............. 523/166 |

FOREIGN PATENT DOCUMENTS

| JP | 2005-170973 A | 6/2005 | |
| JP | 2010-43155 A | 2/2010 | |
| JP | 2011-225768 A | 11/2011 | |
| JP | 2011225768 A | * 11/2011 | |
| WO | WO 2009104050 A1 | * 8/2009 | ........... B29C 73/163 |

OTHER PUBLICATIONS http://en.wikipedia.org/wiki/Colloidal_silica, 2014.*
https://en.wikipedia.org/wiki/Fumed_silica, Sep. 2006.*
JP 2011225768 A, Nov. 2011, Machine translation.*
http://www.nissanchem-usa.com/products/snowtex/, 2014.*
Office Action dated Jan. 5, 2016 for Japanese Application No. 2013-545615.
espacenet English abstract of JP 2010-43155 A.
espacenet English abstract of JP 2005-170973 A.
espacenet English abstract of JP 2011-225768 A.
Office Action dated Jul. 1, 2016 for Chinese Application No. 201180061926.6.

* cited by examiner

*Primary Examiner* — Satya Sastri
(74) *Attorney, Agent, or Firm* — Ladas & Parry LLP

(57) ABSTRACT

Sealing composition for repairing tires comprising: 15 to 80% of natural latex, 5 to 50% of synthetic latex, 10 to 60% of a glycol selected from ethylene glycol and propylene glycol and 0.05 to 5% of a mineral chosen from a phyllosilicate and silica having an average granulometric distribution in the range between 5 and 95 nm.

18 Claims, No Drawings

SEALING COMPOSITION FOR REPAIRING TYRES

RELATED APPLICATION INFORMATION

This application is a 371 of International Application PCT/IB2011/055878 filed 21 Dec. 2011 entitled "Sealing Composition For Repairing Tyres", which was published in the English language on 28 Jun. 2012, with International Publication Number WO 2012/085869 A1, and which claims priority from Italian Patent Application No.: TO2010A001031 filed 21 Dec. 2010 and U.S. Provisional Patent Application No. 61/434,888 filed 21 Jan. 2011, the contents of which are incorporated herein by reference.

TECHNICAL FIELD

The present invention relates to a sealing composition for repairing tyres.

BACKGROUND ART

When a tyre is punctured, it is now common practice to use a sealing composition. Said composition is poured into the tyre to repair the puncture from the inside, thus ensuring an air-tight seal of the tyre.

Different sealing compositions are known in which a rubber latex, generally natural rubber, is mixed with an adhesive and an anti-freeze agent.

The drawback, however, is that said compositions, if kept for long periods, are subject to phenomena of aggregation between the latex particles and the adhesive particles resulting in the composition taking on a creamy look. Generally, therefore, when said creamy composition is dispensed, it obstructs the dispenser valve and is not able to adequately repair the puncture.

Studies carried out by the inventors have shown that one of the causes of obstruction of the dispenser valve appears to be the large dimension of the natural rubber particles of approximately 1 micron and their non-uniform and unstable granulometric distribution.

Compositions are also known which do not contain an adhesive agent. However, also said compositions cause obstruction of the dispenser valve.

Therefore the need is felt in the art for a new sealing composition for repairing tyres which is without the drawbacks of the known compositions.

DISCLOSURE OF INVENTION

The object of the present invention is therefore to find a sealing composition which is stable in the long term with rubber latex particles which are not subject to phenomena of aggregation resulting in obstruction of the dispenser valve, but at the same time maintains the sealing capacity.

Said object is achieved by the sealing composition as claimed in claim 1.

BEST MODE FOR CARRYING OUT THE INVENTION

Phyllosilicates are silicates characterised by a layered structure with tetrahedral symmetry in which each tetrahedron tends to bind with another three by means of oxygen bridges. The members of this family, generally, have a lamellar or scaly appearance, with well-defined cleavage. They are calcium, magnesium, aluminium, sodium, iron, lithium or barium silicates. They are soft minerals, with low specific gravity and the cleavage sheets can be flexible or elastic.

In particular, the particles of phyllosilicate and silica added to the sealing composition perform both a lubricating action on the composition, reducing aggregation of the particles of natural latex and therefore facilitating its passage through the dispenser valve, and at the same time an adjuvant action during sealing of the puncture as they penetrate into the latex mixture during polymerisation, performing a mechanical reinforcement action.

Preferably the mineral used is silica or kaolin.

Advantageously, the mineral used has an average granulometric distribution in the range between 5 and 95 nm, in particular between 10 and 30 nm.

According to a preferred embodiment, the synthetic latex has average granulometry in the range between 0.05 and 0.3 µm and has been advantageously used for the production of a sealing composition. Said formulation is able to considerably stabilise the sealing composition thus avoiding aggregation of the particles, while maintaining an optimal sealing power characteristic of the compositions based on natural latex.

It has furthermore been noted that a diameter of the particles of synthetic latex with an average granulometric distribution in the range 0.05-0.3 µm is more preferable, and even more preferably a granulometric distribution of 0.1.

According to a preferred embodiment of the invention the sealing composition comprises natural latex in an amount in the range between 40 and 70%, a synthetic latex in an amount in the range between 10 and 20% and ethylene glycol in an amount in the range between 20 and 50%. More preferably the composition comprises:

30-35% of natural latex;
32-37% of synthetic latex;
25-31% of propylene glycol;
0.4-0.7% of silica having a granulometric distribution in the range between 10 and 30 nm.

Preferably the synthetic latex has a gelatinisation rate of at least 25% measured according to a mechanical stability test of the Mallon type based on JIS-K6387, more preferably greater than 50%, and is advantageously selected from the group consisting of styrene-butadiene and carboxylated styrene-butadiene.

Furthermore the natural latex used has given excellent results when deproteinised.

The sealing composition can furthermore comprise a polyurethane latex which has a further stabilising effect and is added in an amount in the range between 0.5% and 3%, preferably 1-2%.

Lastly the sealing composition can also comprise additives such as an anti-oxidant agent, preferably in an amount of 0.05-3%, more preferably 0.1-1.5%, and a stabiliser agent preferably in an amount of 0.2-3, more preferably 0.5-2%.

Further characteristics of the present invention will become clear from the following description of some merely illustrative and non-limiting examples.

EXAMPLES

Example 1

Chemical-Physical Characterisation of a Sealing Composition Comprising Silica

The composition illustrated in Table 1 was produced according to the invention.

TABLE 1

| Components | Producer | Quantity (g ± 0.5%) |
|---|---|---|
| Natural latex | THAI Latex (Thailand) | 314 |
| Stabiliser | LDBS 23 (Cogins) | 20 |
| Antioxidant | WLL (New Tiarco) | 10 |
| Antifreeze agent | Proplylene Glycol (Hengyang) | 300 |
| Synthetic latex | SBR Latex (Dow) | 350 |
| Mineral | $SiO_2$ (granule dimension 15-25 nm) (Henan Wangu) | 6 |
| | Total | 1000 |

The viscosity, the pH and the specific gravity (SpG) were evaluated on different batches of the composition illustrated in Table 1. The results are given in Table 2.

TABLE 2

| | Physical properties | | |
|---|---|---|---|
| Batch number | Viscosity (Cps) | pH | Specific gravity (SpG) |
| 1 | 68.7 | 7.43 | 1.0016 |
| 2 | 63.3 | 7.44 | 1.0075 |
| 3 | 62.1 | 7.46 | 1.0087 |

Example 2

Freezing Test

The freezing test was performed on the three batches of the composition illustrated in example 1 to verify maintenance of the properties of the sealing composition also at low temperatures, in particular at −40° C.

50 ml of sealing composition were placed in a glass beaker. The beaker was then placed in a refrigerator and kept at −40° C. for 8 hours.

The sample of sealing composition in all three batches analysed shows no signs of freezing or crystalline formations on the surface.

Example 3

Test for Evaluation of Sealing Power

The sealing power of the composition was evaluated on Ford tyres (ES8S43-19L523-AA) in which a puncture was made between the grooves with a 6 mm diameter steel nail.

The reduction of the tyre pressure after 30 seconds, measured to determine a linear deflation speed in kPa/min, was higher than 50 kPa.

Subsequently the tyre was fitted on a shuttle bus and connected to a compressor. The sealing composition of example 1 was injected into the tyre which was then inflated to 240 kPa.

The shuttle bus was driven for 10 minutes at a minimum speed of 30 km/h and maximum speed of 80 km/h, measuring the tyre pressure to evaluate the sealing power according to the pressure loss after 3 minutes, 5 minutes and 7 minutes and verifying any leaks from the puncture made.

Subsequently the shuttle bus was stopped and the pressure was measured again after 1 hour and 2 hours.

The results obtained are given in Table 3.

As can be seen, the sealing composition proved capable of sealing the tyre not only at ambient temperature but also at 70° C. and at −40° C. even after 5 minutes. Although at low temperatures the time required to disperse the sealing composition is considerably longer, sealing nevertheless takes place within the first 5 minutes.

TABLE 3

| Batch | Tyre temperature (° C.) | Pressure drop after 30 s P0 250 (kPa) | Injection of sealing composition sigillante t (s) | Tyre inflation | | | | ΔP 3 min (kPa) | ΔP 5 min (kPa) | ΔP 7 min (kPa) | ΔP 1 h (kPa) | ΔP 2 h (kPa) |
|---|---|---|---|---|---|---|---|---|---|---|---|---|
| | | | | MaxP (kPa) | MinP (kPa) | P final (psi) | t min (s) | | | | | |
| Sealing composition kept at ambient temperature | | | | | | | | | | | | |
| 2 | 16 | 200 | 38 | 621 | 138 | 40 (35) | 4'48" | 79 | −4 | −3 | 4 | 3 |
| Sealing composition kept at 70° C. for 2 hours | | | | | | | | | | | | |
| 4 | 70 | 200 | 29 | 510 | 97 | 38 (35) | 4'07" | 20 | 7 | 7 | 14 | 7 |
| 1 | 70 | 200 | 27 | 483 | 110 | 39 (35) | 4'35" | 27 | 7 | 7 | 14 | 7 |
| Sealing composition kept at −40° C. for 2 hours | | | | | | | | | | | | |
| 4 | −40 | 200 | 790 | 552 | 110 | 38 (35) | 8'09" | 41 | 3 | −3 | 10 | 3 |
| 1 | −40 | 200 | 204 | 552 | 124 | 38 (35) | 10'24 | 13 | −6 | −7 | 10 | 7 |
| 2 | −40 | 205 | 110 | 469 | 97 | 37 (35) | 9'30" | 3 | 0 | −3 | 10 | 7 |

Example 4

Chemical-Physical Characterisation of a Sealing Composition Comprising Kaolin

The composition illustrated in Table 4 was produced according to the invention.

TABLE 4

| Components | Producer | Quantity (g ± 0.5%) |
|---|---|---|
| Natural latex | THAI Latex (Thailand) | 318 |
| Stabiliser | LDBS 23 (Cogins) | 19 |
| Antioxidant | WLL (New Tiarco) | 10 |
| Antifreeze agent | Proplylene Glycol (Hengyang) | 285 |
| Synthetic latex | SBR Latex (Dow) | 350 |
| Mineral | Kaolin | 18 |
| Total | | 1000 |

Viscosity, pH and specific gravity (SpG) were evaluated on different batches of the composition illustrated in Table 4. The results are given in Table 5.

TABLE 5

| | Physical properties | | |
|---|---|---|---|
| Batch number | Viscosity (Cps) | pH | Specific gravity (SpG) |
| Batch 4 | 65.3 | 7.20 | 1.0024 |
| Batch 5 | 67.8 | 7.32 | 0.998 |
| Batch 6 | 65.7 | 7.34 | 1.0032 |

The invention claimed is:

1. A sealing composition for repairing tyres consisting of in percentages by weight based on the total weight of the listed components:
   from 15% to 80% of natural latex;
   from 5 to 50% synthetic latex;
   from 10 to 60% of a glycol selected from the group consisting of propylene glycol and ethylene glycol; and optionally an additive selected from the group consisting of an anti-oxidant agent, a stabilising agent and mixtures thereof; and
   0.4-0.7% silica.

2. The composition according to claim 1, wherein said silica has an average granulometric distribution in the range between 5 and 95 nm.

3. The sealing composition according to claim 1, wherein said silica has an average granulometric distribution in the range between 10 and 30 nm.

4. The sealing composition according to claim 1, wherein the diameter of the particles of said synthetic latex has an average granulometric distribution in the range between 0.05 and 0.3 μm.

5. The sealing composition according to claim 4, wherein said diameter of the particles of said synthetic latex has an average granulometric distribution of 0.1 μm.

6. The sealing composition according to claim 1, wherein said natural latex is present in an amount in the range between 40 and 70%.

7. The sealing composition according to claim 1, wherein said synthetic latex is present in an amount in the range between 10 and 20%.

8. The sealing composition according to claim 1, wherein said glycol is present in an amount in the range between 20 and 50%.

9. The sealing composition according to claim 1, consisting of:
   30-35% of natural latex;
   32-37% of synthetic latex;
   25-31% of propylene glycol;
   0.4-0.7% of silica having a granulometric distribution in the range between 10 and 30 nm.

10. The sealing composition according to claim 1, wherein said natural latex is a natural deproteinised latex.

11. The sealing composition according to claim 1, wherein said synthetic latex is selected from the group consisting of a styrene-butadiene and carboxylated styrene-butadiene latex.

12. The sealing composition according to claim 1, wherein said glycol is propylene glycol.

13. The sealing composition according to claim 1, wherein the synthetic latex includes polyurethane latex in an amount of 0.5 to 10% by weight based on total weight of the composition.

14. The sealing composition according to claim 1, wherein the synthetic latex includes polyurethane latex in an amount of 1% to 4% by weight based on total weight of the composition.

15. The sealing composition according to claim 1, wherein said antioxidant is present in an amount in the range of between 1% and 2.5 and said stabilizing agent is present in an amount in the [sic]range of between 0.5 and 4%.

16. The sealing composition according to claim 1, wherein said synthetic latex has a gelatinisation rate of at least 25% measured according to a mechanical stability test of the Mallon type based on JIS-K6387.

17. The sealing composition according to claim 16, wherein said synthetic latex has a gelatinisation rate higher than 50% measured according to a mechanical stability test of the Mallon type based on JIS-K6387.

18. The sealing composition according to claim 1, wherein the synthetic latex includes a polyurethane latex.

* * * * *